C. R. RADCLIFFE.
POWER TRANSMITTING APPARATUS.
APPLICATION FILED APR. 19, 1916.

1,234,802.

Patented July 31, 1917.
2 SHEETS—SHEET 2.

WITNESS

INVENTOR

UNITED STATES PATENT OFFICE.

CARLTON R. RADCLIFFE, OF NEW YORK, N. Y.

POWER-TRANSMITTING APPARATUS.

1,234,802.  Specification of Letters Patent.  Patented July 31, 1917.

Application filed April 19, 1916.  Serial No. 92,180.

*To all whom it may concern:*

Be it known that I, CARLTON R. RADCLIFFE, a citizen of the United States, and a resident of the city of New York, in the county of New York and State of New York, have invented certain new and useful Improvements in Power-Transmitting Apparatus, of which the following is a specification.

The present invention relates to a power transmitting mechanism. It pertains more particularly to devices of the type known as "planetary gear power transmitting apparatus." In these devices power is transmitted from a driving shaft or member to the driven shaft or member by a train of gears, the transmitting mechanism becoming operative as soon as one or more of the elements of the train are caused to change their normal speed relative to the other elements thereof. For the purpose of effecting such change in speed, manually operated means are usually employed, which in most of the cases require more or less careful manipulation.

The main object of the present invention is to produce automatic means for effecting the required change in speed between the elements of the planetary gear, thereby permitting the driving member to impart without shock or jar rotation to the driven member.

Another object of the invention is to provide a device having the advantages above named that at the same time is adapted to act as a planetary gear of the ordinary type with all the advantages of the latter.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
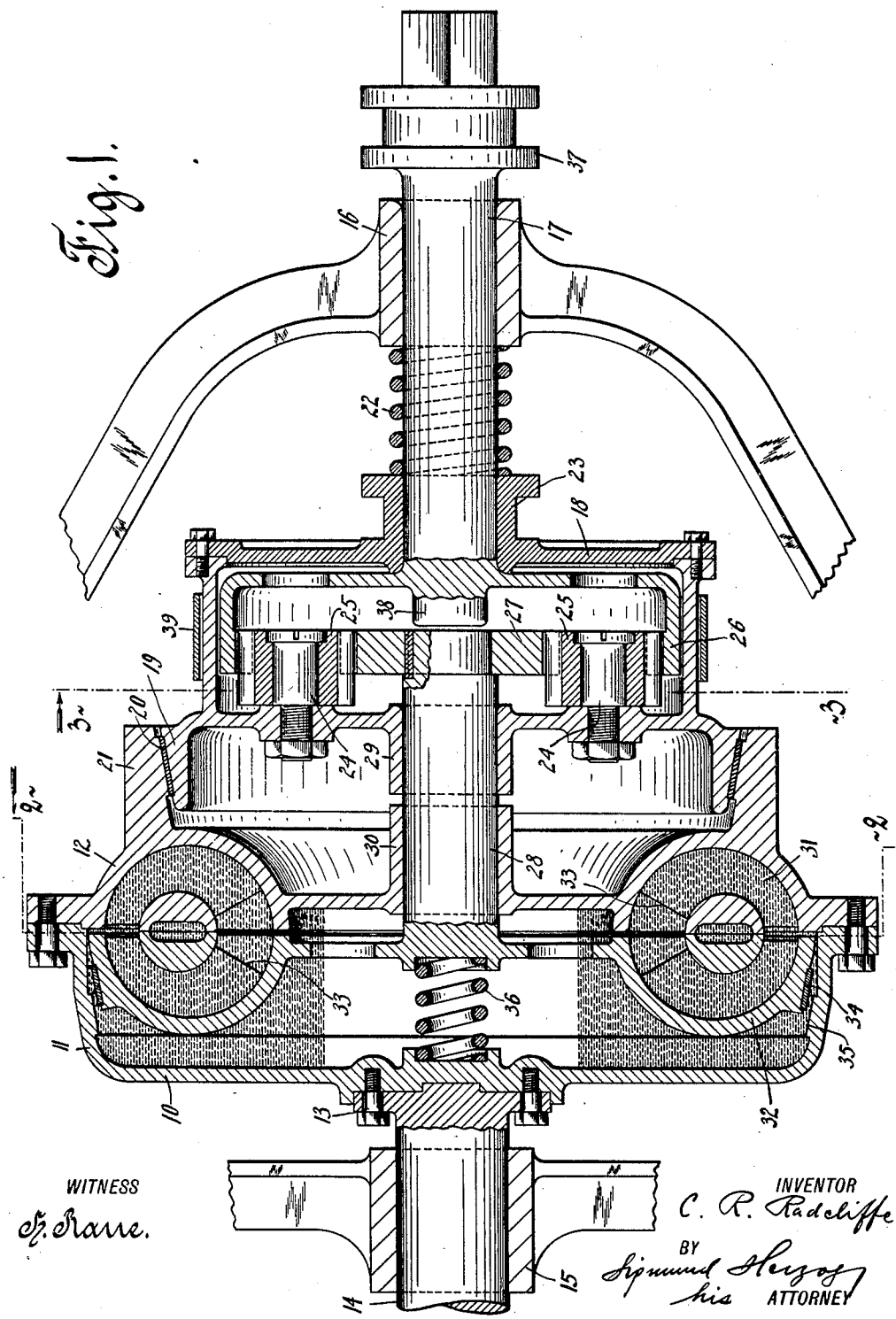
Figure 2:
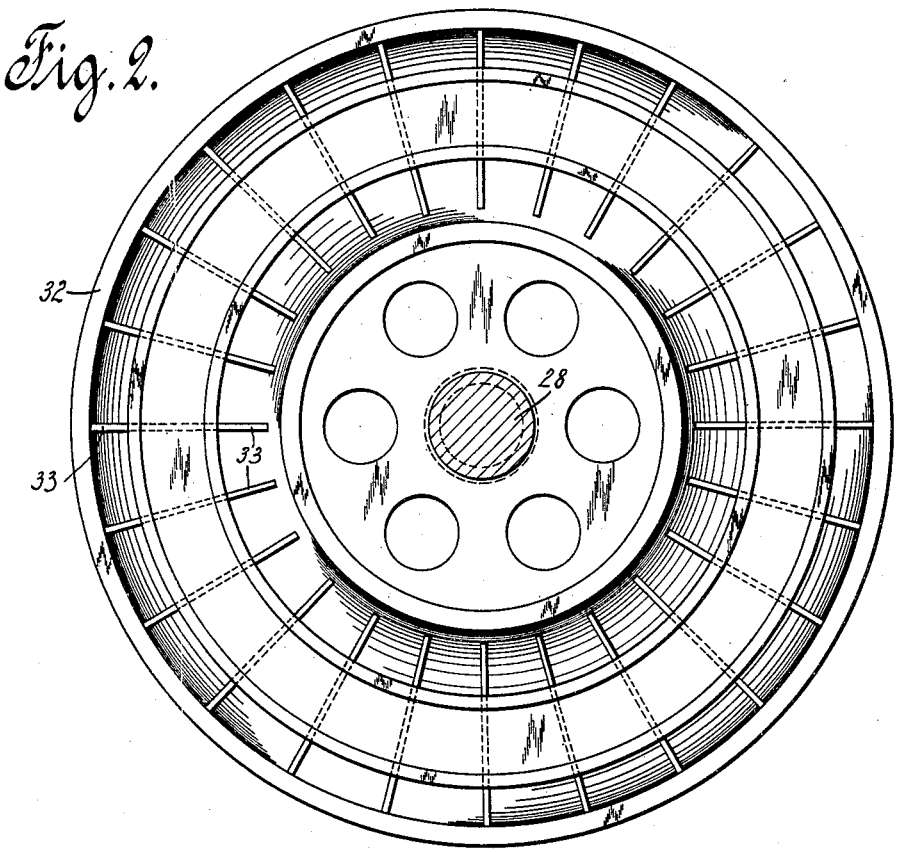
Figure 3:
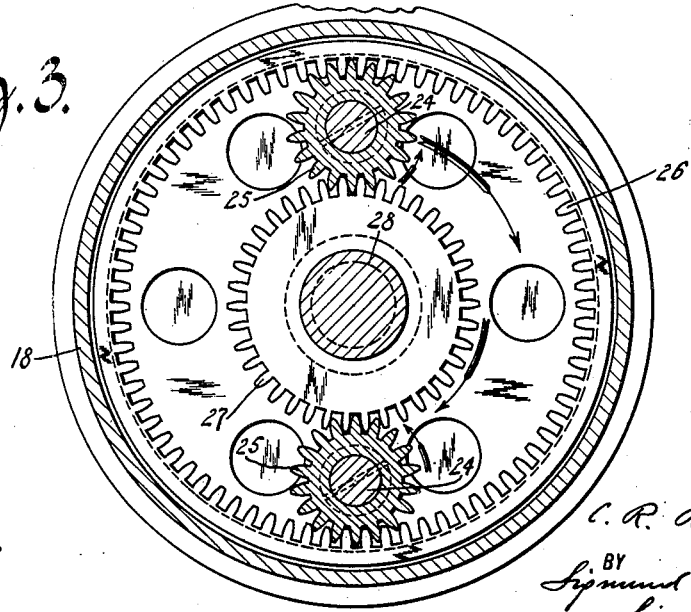

Figure 1 is a central horizontal section taken through a power transmitting apparatus constructed in accordance with this invention; Fig. 2 is a front elevation of one of its elements looking in the direction of the arrow indicated by the numeral 2; and Fig. 3 is a section taken on line 3—3 of Fig. 1.

In the drawings, the numeral 10 indicates a closed casing, made of two parts 11 and 12, which are suitably fastened together. This casing is attached, for instance, by screws 13 to a driving shaft 14, for instance the crank-shaft of an internal combustion engine. The driving shaft is journaled in one or more bearings 15. In alinement with the bearings 15 is disposed a bearing 16, in which is rotatably and shiftably journaled the driven shaft 17 of the mechanism. Upon this shaft is loosely mounted a gear housing 18, that is shiftable upon the driven shaft in the direction of its longitudinal axis. This housing is clutched to the casing 10 in any suitable manner, for instance there may be formed upon the housing 18 an annular rim 19, provided upon its outer face with a brake lining 20, that is engaged with the inner face of an annular portion 21 of the casing 10. For the purpose of holding the clutch members in engagement, there may be used any suitable means, for instance a spring 22, coiled upon the driven shaft and abutting against the bearing 16 and the gear housing 18. For disengaging the clutch members, any suitable means may be employed, for instance there may be formed upon the housing 18 a grooved collar 23, that is engaged by the fork-shaped end of a lever (not shown) in the well known manner.

The connection between the driving shaft and the driven shaft is made by a planetary gearing, one type of which is disclosed in the drawings. The gearing comprises two spindles 24, which are disposed upon diametrically opposite portions of the gear housing or carrier, and have each loosely mounted thereon a pinion 25, that constitute the planet gears of the transmission. These planet gears mesh with an internal gear 26, attached to the driven shaft 17. The planet gears also mesh with a sun gear 27, keyed or otherwise fixed to an arbor 28, that is journaled in bearings 29 and 30, the latter being formed upon the planet gear carrier and the casing 10, respectively.

The arbor 28 is adapted to be connected with the casing 10 by means of a friction clutch, and is mounted for this reason in the bearings 29 and 30 so as to be shiftable in the direction of its longitudinal axis. There are also means provided which have a tendency to retard the rotative speed of said arbor as rotation is imparted to the same by the driving shaft through the intermediary of the planetary gearing. This means comprises, in the case illustrated, a hydraulic brake including two heads 31 and 32, which are alike or similar in design, the former being made integral with or fixedly attached to the casing 10, and the head 32 being carried by the arbor 28. Each of these heads comprises a structure closely resembling that of the runner of a centrifugal pump impeller, provided with straight radially extending blades 33. These heads are mounted relative to each other in a manner that the liquid discharged by one of the same is adapted to flow into the other member of the set. The casing 10 is either partly or wholly filled with a suitable liquid, which, as the casing is rotated, flows from the faster moving head into the slower one, more particularly the faster moving head will discharge the liquid in jets or streams near its periphery, said jets flowing into the slower moving head, which discharges the liquid at its eye, wherefrom it is drawn into the eye of the faster moving head. Upon the head 32 is mounted a brake lining 34, which is adapted to bear against a preferably conical face 35 upon the interior of the casing, thereby locking the head 32 to the casing 10. A spring 36, bearing against the casing and the arbor 28, holds the two members of this last named clutch out of engagement, the head 32 being adapted to be moved into engagement with the casing 10 in any suitable manner, for instance by forming upon the driven shaft 17 a grooved collar 37 for engagement with the forked end of a lever (not shown), said shaft 17 being adapted to shift the arbor 28 by an abutment 38 within the gear housing 18. The gear housing 18 is shaped in the form of a brake drum, that is encircled by a brake band 39. The means for operating this band has not been shown.

The operation of this device is as follows: Normally the gear housing or planet gear carrier 18 is clutched to the casing 10. The operation of this device will best be understood by supposing that a load is applied to the driven shaft 17, and by considering the positions of the parts shown in Fig. 1 of the drawings, wherein the head 32 is disengaged from the casing 10 and the brake band 39 is inoperative in relation to the said gear housing.

If under these conditions rotation is imparted to the driving shaft, the gear housing 18 and the planet gears 25 carried thereby will rotate with the said casing. Inasmuch as the planet gears are in mesh with the internal gear 26, the said planet gears will have an epicyclic movement, the stationary internal gear acting as a fulcrum for the said planet gears. The planet gears, having this fulcrum and being in mesh with the sun gear 27, that is attached to the arbor 28, will rotate the said sun gear in the direction of the driving member, as appears clearly from Fig. 3 of the drawings. Since the internal gear has a diameter that is considerably larger than that of the sun gear, the latter will rotate at a speed that is considerably higher than that of the driving member, or in other words than that of the casing 10. From this it appears that the head 32 moves faster than the head 31. Due to this motion, the liquid in the head 32 moves toward the periphery thereof, and is thrown by the same against the blades of the head 31. These blades, moving slower than the head 32, will act as an abutment in in the same manner as the stationary casing of a hydraulic brake. The result is that the head 32 slows gradually down. As soon as the speed of the head 32 decreases in relation to that of the head 31, the sun gear 27 becomes the fulcrum of the planetary gearing with the result that the internal gear is caused to rotate in the direction of rotation of the sun gear. In this manner the head 32 will be retarded until its speed is substantially equal to that of the casing, for which purpose, of course, the driving member must be accelerated. When this condition is reached, the driven member rotates at approximately the speed of the driving member. From this it appears that the speed of the driven member gradually rises from zero to substantially that of the driving member without shock or jar. The liquid, after it has by impinging upon the blades of the head 31 impeded the rotation of the head 32, flows through the passages in the head 31 toward the eye of the latter and is drawn into the head 32 to repeat the cycle of operation described.

In order to reduce the speed of the driven member 17, it is simply necessary to slow down the driving shaft 14. It is obvious, of course, that means may be provided for decreasing the braking action obtained by the two heads 31 and 32 and the same result will be obtained.

The rotation of the driven member 17 may be stopped altogether by slowing down the driving member 14 to a point where the braking action of the flow of the liquid from one head to the other one is insufficient to retard the sun gear 27. Of course, by disengaging the gear housing or planet gear carrier 18 from the casing 10, the same result may be obtained.

In order to reverse the direction of rotation of the driven shaft in relation to that of the driving shaft, the gear housing 18 is first disengaged from the casing 10, and the head 32 moved into engagement with the said casing. If this is done, the casing 18 starts to rotate slower in the ahead direction. If now the brake band 39 is applied so as to hold the housing against rotation, the direction of rotation of the driven shaft will be reversed.

To drive the shaft 17 at its maximum speed without the intermediary of the planetary gearing, the head 32 is shifted and clutched to the casing 10. In this manner a direct drive is obtained.

The housing 18 may be filled with a suitable lubricant for the well known purpose. The casing 10 need not be filled entirely with the actuating liquid since, as the casing is being rotated, the centrifugal action will throw the liquid toward the periphery of said casing and thereby fill the heads therein. It is preferable to have at least as much liquid in said casing as to submerge the acting portions of the two heads therein and seal them against entrance of air.

Attention is called to the fact that, while herein a planetary gearing of a particular type has been described in connection with the means for causing automatically one of its elements to become a fulcrum, any other gearing may be used without departing from the invention, which lies mainly in connecting the driving and driven shafts by a train of gears in combination with means for automatically changing the relative rotative speed of the elements of the train.

It will be observed from the foregoing that the transmission of power between the driving and driven members of the mechanism takes place always through the planetary gearing, unless a direct drive is desired as above described. The two pump impellers act solely as a hydraulic brake. They are designed in the form of impellers in order to obtain a continuous circulation of the actuating liquid, whereby the liquid is, due to centrifugal force, caused to move in one of the same outward and to be thrown against the vanes of the other, which act as an abutment. The member, the vanes of which act as an abutment, on the other hand, is designed as an impeller to permit the liquid to flow therein after its energy has been dissipated, back to the other member.

What I claim is:—

1. In a power transmitting apparatus, the combination with the driving and driven shafts, of a gearing connecting the same, and means including a centrifugal pump-like element for causing automatically one element of the gearing to become a fulcrum for certain other elements thereof.

2. In a power transmitting apparatus, the combination with the driving and driven shafts, of a planetary gearing connecting the same, and means including a centrifugal pump-like element for causing automatically one element of the gearing to become a fulcrum for certain other elements thereof.

3. In a power transmitting apparatus, the combination with the driving and driven shafts, of a gearing connecting the same including planet gears, and means including a centrifugal pump-like element for causing automatically one element of the gearing to become a fulcrum for said planet gears.

4. In a power transmitting apparatus, the combination with the driving and driven shafts, of a gearing connecting the same, and means including a centrifugal pump-like element for changing automatically the normal speed of one element of the gearing in relation to the other elements thereof, whereby the same is caused to become a fulcrum for certain other elements of the gearing.

5. In a power transmitting apparatus, the combination with the driving and driven shafts, of a planetary gearing connecting the same, and means including a centrifugal pump-like element for changing automatically the normal speed of one element of the gearing in relation to the other elements thereof, whereby the same is caused to become a fulcrum for certain other elements of the gearing.

6. In a power transmitting apparatus, the combination with the driving and driven shafts, of a gearing connecting the same including planet gears, and means including a centrifugal pump-like element for changing automatically the normal speed of one element of the gearing in relation to the other elements thereof, whereby the same is caused to become a fulcrum for said planet gears.

7. In a power transmitting apparatus, the combination with the driving and driven shafts, of a gearing connecting the same, and hydraulic means including a centrifugal pump-like element for causing automatically one element of the gearing to become a fulcrum for certain other elements thereof.

8. In a power transmitting apparatus, the combination with the driving and driven shafts, of a planetary gearing connecting the same, and hydraulic means including a centrifugal pump-like element for causing automatically one element of the gearing to become a fulcrum for certain other elements thereof.

9. In a power transmitting apparatus, the combination with the driving and driven shafts, of a gearing connecting the same including planet gears, and hydraulic means including a centrifugal pump-like element for causing automatically one element of the gearing to become a fulcrum for said planet gears.

10. In a power transmitting apparatus, the combination with the driving and driven shafts, of a gearing connecting the same, and hydraulic means including a centrifugal pump-like element for changing automatically the normal speed of one element of the gearing in relation to the other elements thereof, whereby the same is caused to become a fulcrum for certain other elements thereof.

11. In a power transmitting apparatus, the combination with the driving and driven shafts, of a planetary gearing connecting the same, and hydraulic means including a centrifugal pump-like element for changing automatically the normal speed of one element of the gearing in relation to the other elements thereof, whereby the same is caused to become a fulcrum for certain other elements of the gearing.

12. In a power transmitting apparatus, the combination with the driving and driven shafts, of a gearing connecting the same including planet gears, and hydraulic means including a centrifugal pump-like element for changing automatically the normal speed of one element of the gearing in relation to the other elements thereof, whereby the same is caused to become a fulcrum for said planet gears.

13. In a power transmitting apparatus, the combination with the driving and driven shafts, of a gearing connecting the same, and an automatically acting brake including a centrifugal pump-like element for causing one element of the gearing to become a fulcrum for certain other elements thereof.

14. In a power transmitting apparatus, the combination with the driving and driven shafts, of a planetary gearing connecting the same, and an automatically acting brake including a centrifugal pump-like element for causing one element of the gearing to become a fulcrum for certain other elements thereof.

15. In a power transmitting apparatus, the combination with the driving and driven shafts, of a gearing connecting the same including planet gears, and an automatically acting brake including a centrifugal pump-like element for causing one element of the gearing to become a fulcrum for said planet gears.

16. In a power transmitting apparatus, the combination with the driving and driven shafts, of a gearing connecting the same, and an automatically acting brake including a centrifugal pump-like element for changing the normal speed of one element of the gearing in relation to the other elements thereof, whereby the same is caused to become a fulcrum for certain other elements of the gearing.

17. In a power transmitting apparatus, the combination with the driving and driven shafts, of a gearing connecting the same including planet gears, and an automatically acting brake including a centrifugal pump-like element for changing the normal speed of one element of the gearing in relation to the other elements thereof, whereby the same is caused to become a fulcrum for said planet gears.

18. In a power transmitting apparatus, the combination with the driving and driven shafts, of a gearing connecting the same, and an automatically acting hydraulic brake including a centrifugal pump-like element for causing one element of the gearing to become a fulcrum for certain other elements thereof.

19. In a power transmitting apparatus, the combination with the driving and driven shafts, of a planetary gearing connecting the same, and an automatically acting hydraulic brake including a centrifugal pump-like element for causing one element of the gearing to become a fulcrum for certain other elements thereof.

20. In a power transmitting apparatus, the combination with the driving and driven shafts, of a gearing connecting the same including planet gears, and an automatically acting hydraulic brake including a centrifugal pump-like element for causing one element of the gearing to become a fulcrum for said planet gears.

21. In a power transmitting apparatus, the combination with the driving and driven shafts, of a gearing connecting the same, and an automatically acting hydraulic brake including a centrifugal pump-like element for changing the normal speed of one element of the gearing in relation to the other elements thereof, whereby the same is caused to become a fulcrum for certain other elements of the gearing.

22. In a power transmitting apparatus, the combination with the driving and driven shafts, of a gearing connecting the same including planet gears, and an automatically acting hydraulic brake including a centrifugal pump-like element for changing the normal speed of one element of the gearing in relation to the other elements thereof, whereby the same is caused to become a fulcrum for said planet gears.

23. In a power transmitting apparatus, the combination with the driving and driven shafts, of a gearing connecting the same, and an automatically acting brake for causing one element of the gearing to become a fulcrum for certain other elements thereof, said brake including two elements, one of said elements being connected with the element which becomes a fulcrum and the other one with another element of the gearing.

24. In a power transmitting apparatus, the combination with the driving and driven shafts, of a planetary gearing connecting the same, and an automatically acting brake for causing one element of the gearing to become a fulcrum for certain other elements thereof, said brake including two elements, one of said elements being connected with the element which becomes a fulcrum and the other one with another element of the gearing.

25. In a power transmitting apparatus, the combination with the driving and driven shafts, of a gearing connecting the same including planet gears, and an automatically acting brake for causing one element of the gearing to become a fulcrum for said planet gears, said brake including two elements, one of which is connected with said planet gears and the other one with the element which becomes the fulcrum for said planet gears.

26. In a power transmitting apparatus, the combination with the driving and driven shafts, of a gearing connecting the same, and an automatically acting brake for changing the normal speed of one element of the gearing in relation to the other elements thereof, whereby the same is caused to become a fulcrum for certain other elements of the gearing, said brake including two elements, one of said elements being connected with the element which becomes a fulcrum and the other one with another element of the gearing.

27. In a power transmitting apparatus, the combination with the driving and driven shafts, of a planetary gearing connecting the same, and an automatically acting brake for changing the normal speed of one element of the gearing in relation to the other elements thereof, whereby the same is caused to become a fulcrum for certain other elements of the gearing, said brake including two elements, one of said elements being connected with the element which becomes a fulcrum and the other one with another element of the gearing.

28. In a power transmitting apparatus, the combination with the driving and driven shafts, of a gearing connecting the same including planet gears, and an automatically acting brake for changing the normal speed of one element of the gearing in relation to the other elements thereof, whereby the same is caused to become a fulcrum for said planet gears, said brake including two elements, one of which is connected with said planet gears and the other one with the element which becomes the fulcrum for said planet gears.

29. In a power transmitting apparatus, the combination with the driving and driven shafts, of a gearing connecting the same, and an automatically acting hydraulic brake for causing one element of the gearing to become a fulcrum for certain other elements thereof, said brake including two elements, one of said elements being connected with the element which becomes a fulcrum and the other one with another element of the gearing.

30. In a power transmitting apparatus, the combination with the driving and driven shafts, of a planetary gearing connecting the same, and an automatically acting hydraulic brake for causing one element of the gearing to become a fulcrum for certain other elements thereof, said brake including two elements, one of said elements being connected with the element which becomes a fulcrum and the other one with another element of the gearing.

31. In a power transmitting apparatus, the combination with the driving and driven shafts, of a gearing connecting the same including planet gears, and an automatically acting hydraulic brake for causing one element of the gearing to become a fulcrum for said planet gears, said brake including two elements, one of which is connected with said planet gears and the other one with the element which becomes the fulcrum for said planet gears.

32. In a power transmitting apparatus, the combination with the driving and driven shafts, of a gearing connecting the same, and an automatically acting hydraulic brake for changing the normal speed of one element of the gearing in relation to the other elements thereof, whereby the same is caused to become a fulcrum for certain other elements of the gearing, said brake including two elements, one of said elements being connected with the element which becomes a fulcrum and the other one with another element of the gearing.

33. In a power transmitting apparatus, the combination with the driving and driven shafts, of a planetary gearing connecting the same, and an automatically acting hydraulic brake for changing the normal speed of one element of the gearing in relation to the other elements thereof, whereby the same is caused to become a fulcrum for certain other elements of the gearing, said brake including two elements, one of said elements being connected with the element which becomes a fulcrum and the other one with another element of the gearing.

34. In a power transmitting apparatus, the combination with the driving and driven shafts, of a gearing connecting the same including planet gears, and an automatically acting hydraulic brake for changing the normal speed of one element of the gearing in relation to the other elements thereof, whereby the same is caused to become a fulcrum for said planet gears, said brake including two elements, one of which is connected with said planet gears and the other one with the element which becomes the fulcrum for said planet gears.

35. In a power transmitting apparatus, the combination with the driving and driven shafts, of an internal gear carried by said driven shaft, a sun gear, planet gears carried by said driving shaft and meshing with said internal and sun gears, and a brake including two members, one of which is connected with said sun gear and the other one with said planet gears for causing automatically said sun gear to become the fulcrum for said planet gears.

36. In a power transmitting apparatus, the combination with the driving and driven shafts, of an internal gear carried by said driven shaft, a sun gear, planet gears carried by said driving shaft and meshing with said internal and sun gears, and a hydraulic brake including two members, one of which is connected with said sun gear and the other one with said planet gears for causing automatically said sun gear to become the fulcrum for said planet gears.

37. In a power transmitting apparatus, the combination with the driving and driven shafts, of an internal gear carried by said driven shaft, a sun gear, planet gears carried by said driving shaft and meshing with said internal and sun gears, and a brake including two members, one of which is connected with said sun gear and the other one with said planet gears for changing automatically the normal speed of said sun gear, whereby the same is caused to become a fulcrum for said planet gears.

38. In a power transmitting apparatus, the combination with the driving and driven shafts, of an internal gear carried by said driven shaft, a sun gear, planet gears carried by said driving shaft and meshing with said internal and sun gears, and a hydraulic brake including two members, one of which is connected with said sun gear and the other one with said planet gears for changing automatically the normal speed of said sun gear, whereby the same is caused to become a fulcrum for said planet gears.

39. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, a gearing connecting said two shafts, at least one member of the gearing being carried by said driving shaft and at least one by said driven shaft, said rotatable brake member being secured to another member of the gearing.

40. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, a planetary gearing connecting said two shafts, at least one member of the gearing being carried by said driving shaft and at least one by said driven shaft, said rotatable brake member being secured to another member of the gearing.

41. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, and a gearing connecting said two shafts and rotatable brake member.

42. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, and a planetary gearing connecting said two shafts and rotatable brake member.

43. In a power transmitting apparatus, the combination with a casing containing a liquid, of a hydraulic brake within said casing including two members, one of which is carried by said casing and the other one rotatably mounted therein, and a gearing connecting said casing and said rotatable brake member.

44. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, a gearing connecting said two shafts and rotatable brake member, and means for locking said rotatable brake member to said driving shaft.

45. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, a gearing connecting said two shafts, at least one member of the gearing being carried by said driving shaft and at least one by said driven shaft, said rotatable brake member being secured to another member of the gearing, and means for locking said rotatable brake member to said driving shaft.

46. In a power transmitting apparatus, the combination with the driving and driven shafts, of a casing rigidly connected to said driving shaft and containing a liquid, a hydraulic brake within said casing including two members, one of which is carried by said casing and the other one rotatably mounted therein, a planetary gearing connecting said two shafts, at least one member of the gearing being carried by said driving shaft and at least one by said driven shaft, said rotatable brake member being secured to another member of the gearing, and means for locking said rotatable brake member to said driving shaft.

47. In a power transmitting apparatus, the combination with a plurality of driving elements adapted to be actuated from a single source of power, of a driven element actuated thereby, and means disposed in braking relation between said driving elements for controlling the relative speeds thereof.

48. In a power transmitting apparatus, the combination with a plurality of driving elements adapted to be actuated from a single source of power, of a driven element actuated thereby, and hydraulic means disposed in braking relation between said driving elements for controlling the relative speeds thereof.

49. In a power transmitting apparatus, the combination with two rotatable members, of a third member adapted to be actuated thereby, and means disposed in braking relation between said first named two rotatable members for controlling the relative speeds thereof.

50. In a power transmitting apparatus, the combination with two rotatable members adapted to be actuated from a single source of power, of means disposed in braking relation between said two members, and a third member adapted to be actuated by said rotatable members.

51. In a power transmitting apparatus, the combination with a plurality of driving elements adapted to be actuated from a single source of power, of a driven element actuated thereby, and means disposed in automatic braking relation between said driving elements for controlling the relative speeds thereof.

52. In a power transmitting apparatus, the combination with a plurality of driving elements adapted to be actuated from a single source of power, of a driven element actuated thereby, and hydraulic means disposed in automatic braking relation between said driving elements for controlling the relative speeds thereof.

53. In a power transmitting apparatus, the combination with two rotatable members, of a third member adapted to be actuated thereby, and means disposed in automatic braking relation between said first named rotatable members for controlling the relative speeds thereof.

54. In a power transmitting apparatus, the combination with two rotatable members, of a third member adapted to be actuated thereby, and hydraulic means disposed in automatic braking relation between said first named rotatable members for controlling the relative speeds thereof.

55. The combination with a planetary gearing, of a hydraulic brake actuated thereby, said brake serving to cause one element of the gearing to become a fulcrum for certain other elements thereof and including two rotary members.

56. The combination with a gearing, of a hydraulic brake actuated thereby, said brake serving to cause one element of the gearing to become a fulcrum for certain other elements thereof and including two rotary members.

Signed at New York, in the county of New York and State of New York, this 11th day of April, A. D. 1916.

CARLTON R. RADCLIFFE.